United States Patent [19]

Ohmori et al.

[11] 4,321,676
[45] Mar. 23, 1982

[54] ANTISKID BRAKE DEVICE

[75] Inventors: Taiji Ohmori, Kawagoe; Makoto Sato, Kamifukuoka, both of Japan

[73] Assignee: Honda Giken Kogyo Kabushiki Kaisha, Tokyo, Japan

[21] Appl. No.: 92,498

[22] Filed: Nov. 8, 1979

[30] Foreign Application Priority Data

Nov. 16, 1978 [JP] Japan .................. 53-140497

[51] Int. Cl.$^3$ ................................................ B60T 8/02
[52] U.S. Cl. ............................... 364/426; 303/97; 303/106; 303/109
[58] Field of Search .............. 364/426; 303/95, 97, 303/99, 106, 108, 109

[56] References Cited

U.S. PATENT DOCUMENTS

| | | | |
|---|---|---|---|
| 3,705,748 | 12/1972 | Ochiai | 303/109 |
| 3,744,855 | 7/1973 | Ochiai | 303/109 |
| 3,902,763 | 9/1975 | Takeuchi | 303/106 |
| 4,036,536 | 7/1977 | Quon | 303/97 X |
| 4,135,769 | 1/1979 | Williams et al. | 303/106 |

Primary Examiner—Jerry Smith

Attorney, Agent, or Firm—Armstrong, Nikaido, Marmelstein & Kubovcik

[57] ABSTRACT

An antiskid brake device in which the braking force on wheels is controlled while processing a wheel speed signal and a vehicle speed signal. A reference wheel speed signal setter provides a reference wheel speed signal in response to the vehicle speed by adding a predetermined slip rate which is preset on the basis of the vehicle speed. A signal level adjustor adjusts the level of at least one of the wheel speed signal and the reference wheel speed signal so as to uniformly increase a signal level of the wheel speed signal relative to the reference wheel speed signal. The wheel speed signal is compared after being adjusted in level, with the reference wheel speed signal. The signal level adjustor may be in the form of an adder which adds a wheel speed to correspondence signal of relatively small value to the wheel speed signal. The signal level adjustor can also be in the form of an operational amplifier which subtracts a signal value determined in response to a predetermined applied voltage from a vehicle speed signal in a stage prior to addition of the slip rate.

7 Claims, 10 Drawing Figures

ANTISKID BRAKE DEVICE

FIELD OF THE INVENTION

The present invention relates to an antiskid brake device which, even if signal noise is contained in the wheel speed signal, does not give rise to erroneous operation of the antiskid device and does not adversely affect the operator's feel in operation of the brake device at braking, while minimizing the reduction of the braking efficiency within a satisfactorily small range.

DESCRIPTION OF THE PRIOR ART

In a vehicle provided with an antiskid brake device, when the wheel is subjected to a sudden braking force, the wheel speed abruptly reduces which introduces the danger of locking the wheel. Upon occurrence of a danger of locking the wheel, the antiskid device is actuated to release the braking force applied to the wheel. When the braking force is released, the wheel begins to increase its speed. When the wheel speed is restored to a degree that the wheel will not be locked any longer, the braking force releasing action of the antiskid device stops so that the wheel is again subjected to the braking force and as a consequence, the wheel speed is again abruptly reduced. Thereafter, such operation is repeatedly effected whereby the wheel speed undergoes a series of periodic variations based on the action of the antiskid brake device while the vehicle speed is reduced.

This antiskid device is designed so as to receive as one of its input parameters, a reference wheel speed signal established by adding the predetermined slip rate of the wheel to the vehicle speed signal representative of the vehicle speed, and at the time of braking, to compare the wheel speed signal representative of the wheel speed with the reference wheel speed signal to control the braking force of the wheel according to the results of the comparison.

The slip rate of the wheel may be defined as the difference between the vehicle speed and the peripheral speed of the wheel divided by the vehicle speed, as given by $$\lambda = (U - Uwi)/U$$

where U is the vehicle speed, Uwi the peripheral speed of the wheel, and $\lambda$ the slip rate of the wheel. It is known that the best braking efficiency may be obtained when the slip rate $\lambda$ is from about 15 to about 25%. In the past, the slip rate of the wheel has been first preset to a given value within the range from about 15 to 25% and the slip rate thus set to a given value was then added to the vehicle speed signal to establish the reference wheel speed signal. Alternatively, as disclosed in Japanese Patent Publication No. 3868/1976, the reference slip rate as a reference point at which the braking force releasing mechanism starts to operate was preset so that the higher the vehicle speed, the greater was the reference slip rate, and the lower the vehicle speed, the smaller was the slip rate. This is in consideration of the delayed actuation characteristic of the braking force releasing mechanism in order that the slip rate of the wheel may be maintained substantially at a given value within the range from about 15 to 25% at all times, when the antiskid device is actually operated.

Incidentally, in the event the wheel speed is obtained as a wheel speed signal in the form of an analog signal, the wheel speed signal contains various signal noises resulting from irregular road surfaces, operation processing of signals, and the like. The waveforms of the wheel speed signals at braking include waveforms of relatively large amplitude as a result of action of the antiskid brake device and also fine-oscillating waveforms of relatively small amplitude. In comparing the wheel speed signal with the reference wheel speed signal for operational processing, the signal noises in the form of fine-oscillating waveforms of relatively small amplitude may be disregarded when the vehicle speed is high but may adversely affect the antiskid control to a degree that cannot be disregarded. This is because it gives rise to erroneous operation of the antiskid device, adversely affecting the feel, in operation of the control device at the braking, and decreases the braking efficiency principally for the reasons given below.

1. When the vehicle speed is high, the rotational motion of the wheels remains relatively stabilized giving rise to less fine variation in the rotation of the wheels due to irregular road surfaces, whereas when the vehicle speed is reduced, the rotational motion of the wheels tends to be finely varied due to irregular road surfaces. In converting the wheel speed signal from a pulse signal into an analog signal, a residual ripple becomes large in view of the filter characteristic as the frequency of pulse signal decreases; and 2. When the vehicle speed is high at the initial stage of the braking operation, there is a large difference between the value of the vehicle speed signal and the value of the reference wheel speed signal. The rate of amplitude of the waveform of the wheel speed signal relative to the difference in value between the vehicle speed signal and the reference wheel speed signal is relatively small, whereas, when the vehicle speed is reduced at the later stage of the braking operation, the difference between the value of the vehicle speed signal and the value of the reference wheel speed signal is reduced so that the ratio of the amplitude of the waveform due to signal noise to the difference between the vehicle speed signal and the reference wheel speed signal just mentioned above, becomes relatively large.

Accordingly, it is a primary object of the present invention to provide an antiskid brake device which even if signal noise is contained in the wheel speed signal, does not give rise to erroneous operation of the antiskid device and does not adversely affect the operator's feel in operation of the control device at braking, and which minimizes the reduction of the braking efficiency within a satisfactorily small range.

The invention will best be understood by reference to the following description taken in connection with the accompanying drawings.

DESCRIPTION OF THE PREFERRED EMBODIMENTS

Figure 1:
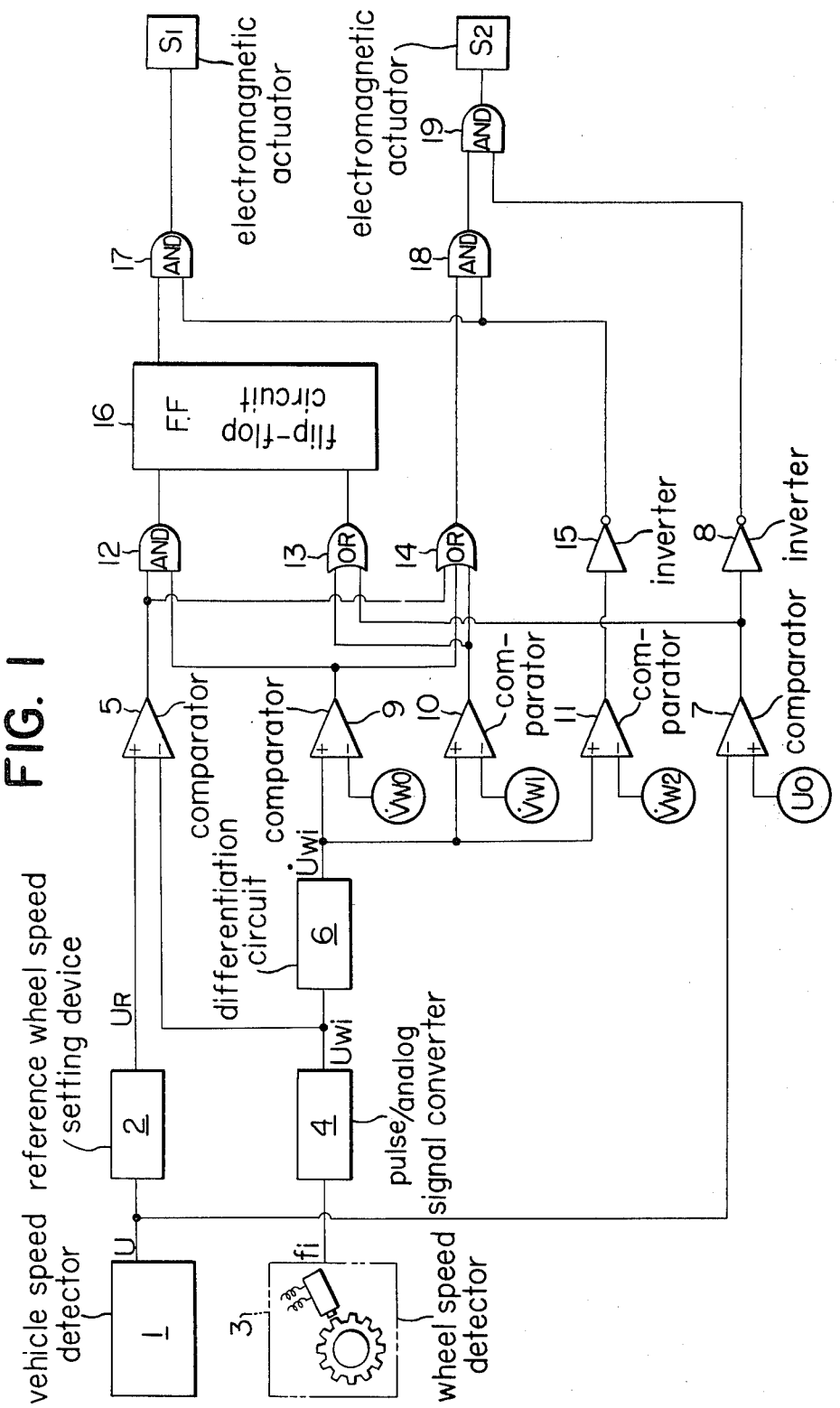
FIG. 1 is a circuit diagram of a conventional antiskid brake device.

Referring first to FIG. 1 there is shown one embodiment of a control circuit for feeding control signals to a braking force releasing electromagnetic actuator. The vehicle speed signal U corresponding to the vehicle speed is detected by a vehicle speed detector 1, from which ground speed of the vehicle is estimated or detected in a suitable manner. The vehicle speed is fed to a reference wheel speed signal setting device 2 as well as a comparator 7. A reference wheel speed signal setting device 2 includes a logical operation section for adding a predetermined slip rate λ of the wheel to the vehicle speed signal, and an output section for delivering the vehicle speed signal U with the slip rate λ of the wheel added thereto as a reference wheel speed signal $U_R$. The reference wheel speed signal $U_R$ is established by the relationship $$U_R = (1-\lambda)U,$$

and this signal is fed, as an output signal, to the comparator 5.

The peripheral speed of the wheel forming the parameter for controlling the braking force, is detected by a wheel speed detector 3 attached to the wheel. The wheel speed detector 3 produces, as its output signal, a frequency signal fi of a value proportional to the peripheral speed of the wheel. The signal fi is immediately converted into a wheel speed signal Uwi of a value proportional to the wheel speed, as an analog signal, by a pulse/analog signal converter 4 which converts the pulse signal into a corresponding analog signal.

The wheel speed signal Uwi is successively fed to the comparator 5 and a differentiating circuit 6. The differentiating circuit 6 differentiates the wheel speed signal Uwi to produce a wheel acceleration signal $\mathring{U}wi$ as an output signal. The wheel acceleration signal $\mathring{U}wi$ is applied to comparators 9, 10 and 11.

The comparator 5 is designed so that the wheel speed signal $\mathring{U}wi$ is compared with the reference wheel speed signal $U_R$. Only when the value of the wheel speed signal $\mathring{U}wi$ is smaller than the value of the reference wheel speed signal $U_R$, an output signal is provided. This output signal is applied to AND circuit 12 and OR circuit 14. The comparator 9 is designed so that the wheel acceleration signal $\mathring{U}wi$ is compared with a reference wheel deceleration signal $-\mathring{V}wo$ representative of a preset negative reference acceleration. An output signal is provided only when the value of the wheel acceleration speed $\mathring{U}wi$ is smaller than the value of the reference wheel deceleration signal $-\mathring{V}wo$. This output signal is applied to AND circuit 12 and OR circuit 14. The comparator 10 is designed so that the wheel acceleration signal $\mathring{U}wi$ is compared with the first reference wheel acceleration signal $\mathring{V}wi$. An output signal is provided only when the value of the wheel acceleration signal $\mathring{U}wi$ is larger than the value of the first reference wheel acceleration signal $\mathring{V}wi$. This output signal is applied to OR circuit 13 and OR circuit 14. The comparator 11 is designed so that the wheel acceleration signal $\mathring{U}wi$ is compared with a preset second reference wheel acceleration signal Vw2 having a value larger than that of the first reference wheel acceleration signal $\mathring{V}wi$. An output signal is provided only when the value of the wheel acceleration signal $\mathring{U}wi$ is larger than the value of the second reference wheel acceleration signal $\mathring{V}w2$. This output signal is applied to inverter 15. Further, a comparator 7 is designed so that the vehicle speed signal U is compared with a preset low reference vehicle speed signal Uo. An output signal provided only when the value of the vehicle speed signal U is smaller than the value of the low reference vehicle speed signal Uo. This output signal is applied to OR circuit 13 and inverter 8.

The output signal of the AND circuit 12 and the output signal of the OR circuit 13 are respectively applied to a bistable or flip-flop circuit 16, and the output signal of the flip-flop circuit 16 is in turn applied to an AND circuit 17. The output signal of the OR circuit 14 is applied to an AND circuit 18, and the output signal of the inverter 15 is applied to AND circuit 17 and AND circuit 18. The output signal of the inverter 8 is applied to an AND circuit 19. The output signal of the AND circuit 17 is applied to a first electromagnetic actuator S1, and the output signal of the AND circuit 19 is applied to a second electromagnetic actuator S2.

The operation of the first and second electromagnetic actuators S1 and S2 is as follows: When a signal is not applied to the first and second electromagnetic actuators S1 and S2, each of the electromagnetic actuators S1 and S2 will not act on the braking device, and the braking device freely increases its braking force applied to the associated wheel according to a brake operating input induced by an operator. When a signal is not applied to the first electromagnetic actuator S1 but a signal is applied to the second electromagnetic actuator S2, each of the electromagnetic actuators S1 and S2 acts on the braking device in a manner, such that the braking force is maintained constant so that even if the brake operating input should be increased, the braking force will not be increased accordingly. Further, when a signal is applied to both the first and second electromagnetic actuators S1 and S2, each of the electromagnetic actuators S1 and S2 acts on the braking device so that the braking force is decreased regardless of the brake operating input.

The low reference vehicle speed signal Uo is representative of a signal corresponding to the threshold value of the vehicle speed which is so low as not to require the antiskid action. Accordingly, when the value of the vehicle speed signal U is smaller than the value of the low reference vehicle speed signal Uo, the comparator 7 produces an output signal to reset the flip-flop circuit 16 so that no signal is fed to a first electromagnetic actuator S1, and the output signal from the comparator 7 is inverted by the inverter 8 in the course of being applied to the AND circuit 19 so that when the value of the vehicle speed signal U is smaller than the value of the low reference vehicle speed signal Uo, no signal is applied to the second electromagnetic actuator S2. Thus, at this time, the braking force may increase freely according to the brake operating input.

On the other hand, when the value of the vehicle speed signal U is larger than the value of the low reference vehicle speed signal Uo, the comparator 7 will not produce an output signal, and an output signal is applied from the inverter 8 to the AND circuit 19.

It is now assumed that the braking force is applied to the wheel in a state where the value of the vehicle speed signal U is larger than the value of the low reference vehicle speed signal Uo. Since the wheels begin to decelerate at the same time the braking force is applied thereto, at least the comparators 10 and 11 will not then produce an output signal and an output signal of the inverter 15 is applied to the AND circuits 17 and 18. Then, when the value of the wheel speed signal Uwi is smaller than the value of the reference wheel speed signal $U_R$, and the value of the wheel acceleration signal $\mathring{U}wi$ is smaller than the value of the reference wheel deceleration signal $-\mathring{V}wo$, the comparators 5 and 9 each produce an output signal, and as a result, the AND circuit 12 produces an output signal to allow the flip-flop circuit 16 to begin producing an output signal. The flip-flop circuit 16 keeps producing the output signals until a fresh input signal is introduced, and while the flip-flop circuit 16 is producing the output signals, each of the AND circuits 17, 18 and 19 continues to produce an output signal whereby a signal is applied to the electromagnetic actuators S1 and S2, and the braking force decreases regardless of the brake operating input as the danger of locking the wheel occurs.

As the braking force decreases, the wheels gradually increase in speed, and the value of the wheel acceleration signal $\mathring{U}wi$ exceeds the value of the reference wheel deceleration signal $-\mathring{V}wo$ and finally exceeds the value of the first reference wheel acceleration signal $\mathring{V}w1$. At this time, the comparator 10 produces an output signal to apply it to the OR circuits 13 and 14 whereas the flip-flop circuit 16 stops generation of output signals heretofore produced by the input signal from the OR circuit 13. If the value of the vehicle speed signal U becomes smaller than the value of the low reference vehicle speed signal Uo during that period, the comparator 7 produces an output signal so that the OR circuit 13 produces an output signal and the flip-flop circuit 16 in turn receives the output signal from the OR circuit 13 to stop generation of the output signal thereof. At this time, neither of the AND circuits 17 and 19 produces an output signal so that no signal is applied to the electromagnetic actuators S1 and S2.

When the flip-flop circuit 16 stops generating an output signal according to the output signal of the comparator 10 in a state where the value of the vehicle speed signal U remains greater than the value of the low reference vehicle speed signal Uo, the AND circuit 17 will not produce the output signal and no signal is applied to the first electromagnetic actuator S1. At this time, a signal is applied to the second electromagnetic actuator S2, but the period of reducing the braking force terminates at this moment.

When the value of the wheel acceleration signal $\mathring{U}wi$ is further increased to exceed the value of the second reference wheel acceleration signal $\mathring{V}w2$, the comparator 11 produces an output signal, and this output signal is inverted by the inverter 15 whereby the AND circuits 17 and 18 stop generating output signals. As a consequence, no signal is applied to the electromagnetic actuators S1 and S2 so that the braking force freely increases according to the brake operating input.

Figure 2A:
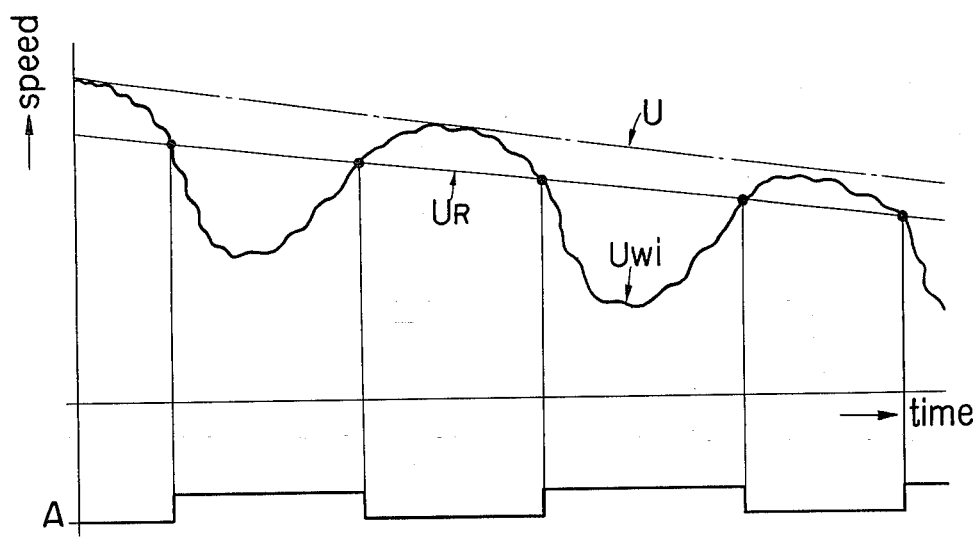
FIG. 2A shows various signal waveforms when the value of the vehicle speed signal is large.
Figure 2B:
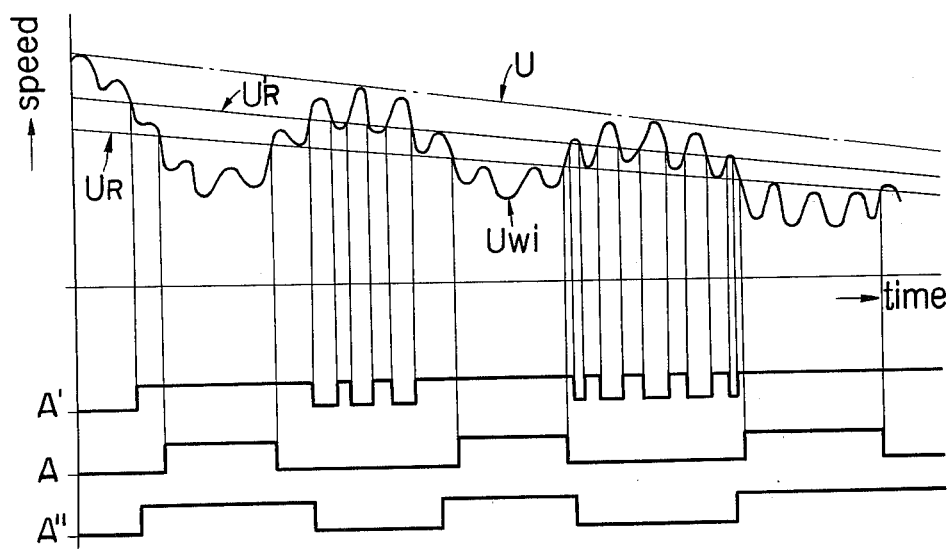
FIG. 2B shows various signal waveforms when the value of the vehicle speed signal is small.

FIGS. 2A and 2B schematically illustrate forms of signals which change with time at the braking of wheels. The signals include the vehicle speed signal U, the wheel speed signal Uwi, the reference wheel speed signal $U_R$ or UR' which is the output signal of the reference wheel speed signal setting device 2, and the output signals A, A' or A'' of the comparator 5. FIG. 2A shows the state where the value of the vehicle speed signal, immediately after commencement of the braking, is relatively large. FIG. 2B shows the state where the value of the vehicle speed signal, some time after commencement of the braking, is relatively small.

In FIG. 2A, the waveforms of the wheel speed signal Uwi include waveforms of relatively large amplitude as a result of action of the antiskid brake device and fine-oscillating waveforms of relatively small amplitude. However, for the reason that the vehicle speed is high, the rotational motion of the wheels remains relatively stabilized giving rise to a reduced amount of fine variation in the rotation of the wheels due to irregular road surfaces. Also, there is a large difference between the value of the vehicle speed signal U and the value of the reference wheel speed signal $U_R$ and the frequency of the input signal fed to the pulse/analog signal converter circuit is high so that the inclusion rate of ripples is limited. The comparator 5 can, when the wheel speed signal Uwi is compared with the reference wheel speed signal $U_R$, make comparison and perform logical operation while discriminating the waveforms of relatively large amplitude as a result of action of the antiskid brake device among the waveforms of the wheel speed signal Uwi. As a consequence of this, it is possible to produce an output signal such as signal A.

In FIG. 2B, since the vehicle speed is relatively low, the rotational motion of wheels tends to be finely varied due to irregular road surface and in converting the wheel speed signal from the pulse signal into the analog signal, a residual ripple becomes large in view of the filter characteristic as the frequency of the pulse signal decreases: since the slip rate of the wheel is always set to a given value regardless of the vehicle speed U, the difference between the value of the vehicle speed signal U and the value of the reference wheel speed signal $U_R$, is reduced. The comparator 5 cannot clearly discriminate the waveform based on the action of the antiskid brake device among the waveforms of the wheel speed signal Uwi from the waveform due to the signal noise. Consequently, there is produced an output signal such as signal A' which contains noise. As a result, the antiskid brake device will malfunction and the operational sense of the brake device at braking is adversely affected resulting in lowering of the braking efficiency and leading to an extremely dangerous condition as the case may be.

Figure 3:
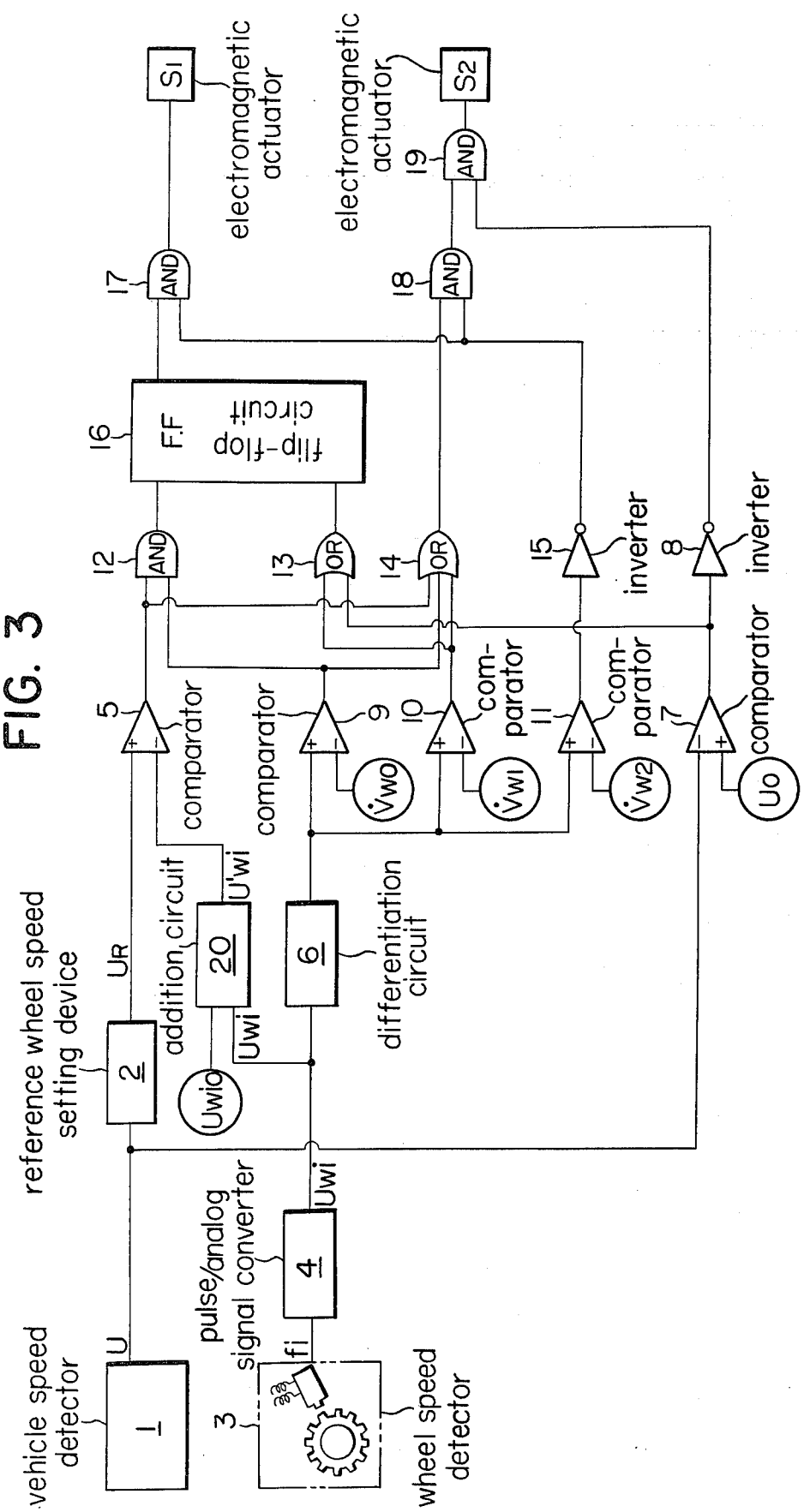
FIG. 3 is a circuit diagram of an antiskid brake device by way of one embodiment in accordance with the present invention.

Referring now to FIG. 3 there is shown a specific circuit construction in accordance with one embodiment of the present invention. The construction of FIG. 3 is totally identical with that of FIG. 1 in various devices or circuits indicated as at 1-19 and electromagnetic actuators $S_1$, $S_2$ with the only exception that in FIG. 3 an adding circuit 20 is interposed between the pulse/analog signal converter 4 and the comparator 5.

The adding circuit 20 in FIG. 3 is designed so that it receives, as an output signal, an output signal Uwi of the pulse/analog signal converter 4. A wheel speed correspondence signal Uwio of the predetermined relatively small given value is added to the input signal and the resultant signal is applied to the comparator 5 as a modified wheel speed signal $U'wi (= Uwi + Uwio)$.

Accordingly, the comparator 5 in FIG. 3 produces a signal under the conditions given by $$Uwi + Uwio < U_R = (1-\lambda)U.$$

From this, in the circuit shown in FIG. 3, the substantial reference slip rate $\lambda_o$, the substantial reference wheel speed signal $U_{RO}$, and the difference $\Delta U$ between the vehicle speed signal U and the substantial reference wheel speed signal $U_{RO}$ are respectively given by $$\lambda_o = \lambda + Uwio/U \quad (1)$$

$$U_{RO} = (1-\lambda)U - Uwio = U_R - Uwio \quad (2)$$

$$\Delta U = U\lambda + Uwio \quad (3)$$

On the other hand, in the prior art circuit shown in FIG. 1, the substantial reference slip rate $\lambda_o$, the substantial reference wheel speed signal $U_{RO}$, and the difference $\Delta U$ between the vehicle speed signal U and the substantial reference wheel speed signal $U_{RO}$ are respectively given by $$\lambda_o = \lambda \quad (4)$$

$$U_{RO} = (1-\lambda)U = U_R \quad (5)$$

$$\Delta U = U\lambda \quad (6)$$

Figure 4:
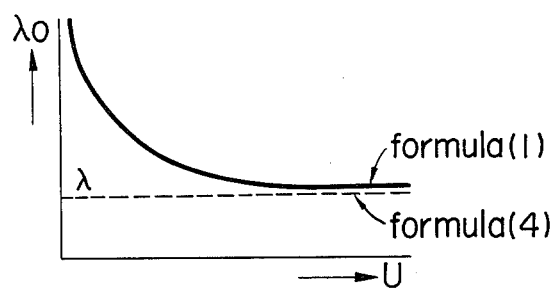
FIG. 4 is a graphic representation showing the comparison between the slip rate $\lambda$ in the conventional circuit and the substantial slip rate $\lambda_o$ in the circuit of FIG. 3.
Figure 5:
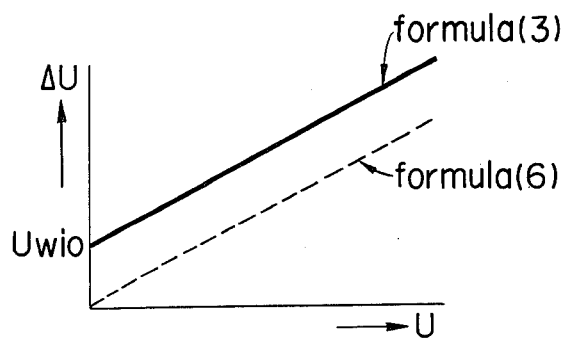
FIG. 5 is a graphic representation showing the difference ΔU between the vehicle speed signal U and the substantial reference wheel speed signal $U_{RO}$ while comparing the case of the conventional circuit with the case of the FIG. 3 circuit.

FIG. 4 is a graphic representation showing the relationship between the above-described equations (1) and (4), and FIG. 5 is a graphic representation showing the relationship between the above-described equations (3) and (6).

As is clear from FIG. 5, the conventional circuit construction is that in the range of low vehicle speed, the difference $\Delta U$ between the vehicle speed signal U and the substantial reference wheel speed signal $U_{RO}$ is extremely small, and there possibly gives rise to erroneous operation of the antiskid device due to the signal noise. However, in accordance with the circuit construction of the present invention, the difference $\Delta U$ between the vehicle speed signal U and the substantial reference wheel speed signal $U_{RO}$ never assumes a level below the wheel speed correspondence signal Uwio of a given value, and the wheel speed correspondence signal Uwio may be suitably established to thereby prevent erroneous operation of the antiskid device in the low speed area.

Figure 6:
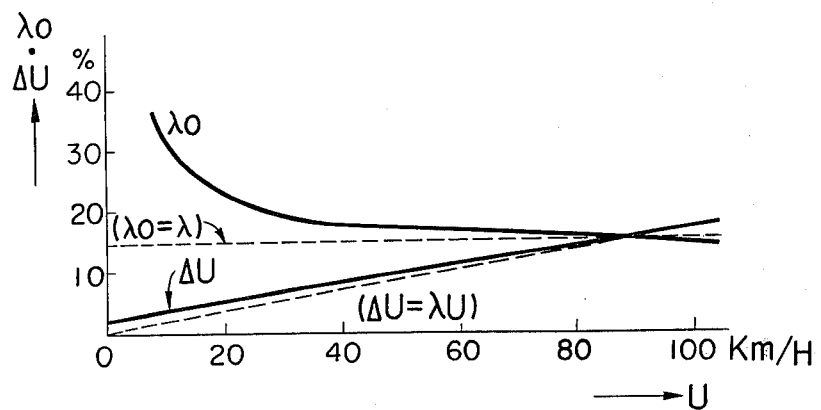
FIG. 6 is a graphic representation showing the substantial slip rate $\lambda_o$ and the aforesaid signal difference ΔU while comparing the case of the conventional circuit with the circuit of FIG. 3 in accordance with the specific embodiment.

FIG. 6 is a graph showing, as for example, the substantial reference slip rate $\lambda_o$ with the slip rate $\lambda = 13\%$ and wheel speed correspondence signal Uwio = 2 Km/hr, and the difference $\Delta U$ between the vehicle speed signal U and the substantial reference wheel speed signal $U_{RO}$. As is clear from FIG. 6, in accordance with the present invention, if the vehicle speed, at which antiskid function is required in practice, is above 20 Km/hr, the substantial reference slip rate $\lambda_o$ is set to 15-25%, whereas if the vehicle speed, at which signal noise possibly occurs, is below 20 Km/hr, the substantial slip rate $\lambda_o$ is increased to increase the difference $\Delta U$ between the vehicle speed signal U and the substantial reference wheel speed signal $U_{RO}$. As a result, it is possible to prevent erroneous operation of the antiskid device. Thus, in accordance with the present invention, since the reference slip rate is large when the value of the vehicle speed signal U is small as shown in FIG. 2B, the difference $\Delta U$ between the vehicle speed signal U and the substantial reference wheel speed signal $U_{RO}$ becomes large. Accordingly, the comparator 5 is possible to definitely discriminate the waveform based on the action of the antiskid brake device out of waveforms of the wheel speed signal Uwi from the waveform resulting from the signal noise, thus producing an output signal like the signal A shown in FIG. 2A. In FIG. 2A, as compared with the signal A'' which is ideal in braking efficiency, the signal A somewhat delays in building-up of a pulse and somewhat quickens in the decaying period of the pulse. However, it contains no signal noise. It is therefore possible to prevent the erroneous operation of the antiskid device and the worsening of the operator's feel in operation of the brake device at braking, while minimizing the reduction of the braking efficiency within an allowable range.

Next, another embodiment of the present invention will be described. In this embodiment, the object of the present invention may be achieved by employing, in lieu of the circuit construction shown in FIG. 3, a circuit device as described below in place of the reference wheel speed signal setting device 2 in FIG. 1.

Figure 7:
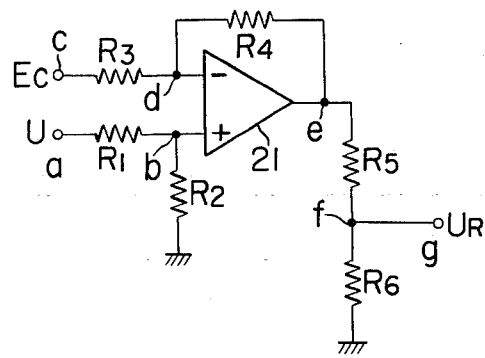
FIG. 7 is a circuit diagram of another embodiment in accordance with the present invention.

In FIG. 7, there is shown an embodiment of a circuit device constructed in accordance with the present invention in place of the conventional reference wheel speed signal setting device 2 shown in FIG. 1. In FIG. 7, a vehicle speed signal U from a non-inversion side input terminal a is applied, as an input signal, to an operational amplifier 21 through a resistor $R_1$ and a connection b grounded through a resistor $R_2$. A given applied voltage Ec applied as the other input to an inversion side input terminal c, is applied to an inversion input of the operational amplifier 21 through a connection d between resistor $R_3$ and resistor $R_4$. An output signal of the operational amplifier 21 is applied to an output terminal g through a connection e, a resistor $R_5$ and a connection f grounded through a resistor $R_6$.

In the relationship between the input and output of the operational amplifier 21 shown in FIG. 7, let U represent the amplitude of the input signal in the non-inversion side input terminal, Ec the amplitude of the input signal in the inversion side input terminal, and let resistors $R_1$, $R_2$, $R_3$ and $R_4$ be related to one another as follows:

$$R_4/R_3 = R_2/R_1 (=k).$$

Then, the output $V_o$ of the operational amplifier 21 is given by $$V_o = R_4/R_3(U - Ec)$$

to constitute an operational circuit. In this case, if k equals to 1 (k=1), the circuit of FIG. 7 is a simple subtracting circuit.

Incidentally, the reference wheel speed signal $U_R$ is obtained at the output terminal g with the result that the resistors $R_5$ and $R_6$ are subject to voltage division through a portion corresponding to the slip rate λ from the operation output $V_o$ of the vehicle speed signal U and the given applied voltage Ec by the voltage division action. Here, the given applied voltage Ec is a voltage below the signal corresponding to the vehicle speed 10 Km/hr, for example, about 5 km/hr in practice. The rate of the given applied voltage Ec and resistors $R_5$, $R_6$ are preset so that the slip rate λ for obtaining the reference wheel speed $U_R$ from the operation output $V_o$ of the given applied voltage Ec and the vehicle speed signal U may assume approximately 15% when the antiskid device is actuated at 60 Km/hr of vehicle speed. The slip rate λ is thereby maintained at approximately 10% at the maximum vehicle speed.

Figure 8:
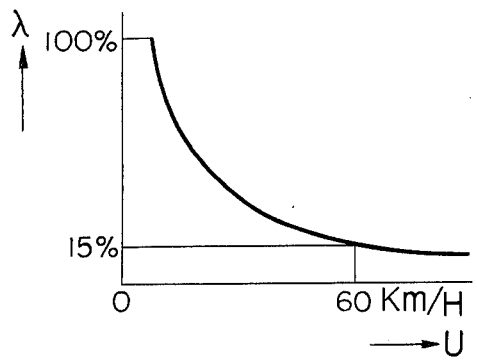
FIG. 8 is a graphic representation showing an example of change in apparent slip rate in the circuit of FIG. 7.

With such set-up of the circuit, the reference wheel speed signal $U_R$ as the slip rate λ is changed, apparently may be obtained as an output signal so that when the value of the vehicle speed signal U is large, the rate of the given applied voltage Ec, —a constant portion is small as compared to the vehicle speed signal U—results in a relatively small value of the slip rate λ. Conversely, when the value of the vehicle speed signal U is small, the rate of the given applied voltage Ec, —a constant portion is large as compared with the vehicle speed signal U—results in a relatively large value of the slip rate λ. FIG. 8 shows one example of the slip rate obtained by the circuit construction shown in FIG. 7, in which as the value of the vehicle speed signal U decreases, and the slip rate λ increases along the continuous curve.

Thus, the slip rate λ of the wheel changes apparently, and there can be provided an antiskid brake device which, even if signal noise is contained in the wheel speed signal Uwi, does not give rise to erroneous operation of the antiskid device and does not adversely affect the operator's sensitivity in operation of the brake device during braking, while minimizing the reduction of the braking efficiency within a satisfactorily small range.

While in the circuit example shown in FIG. 7, the given applied voltage Ec is applied to the inversion input terminal on the input side to thereby effect subtraction, it will be understood that in the connection e on the output side of the operational amplifier 21 in FIG. 7, the subtraction process may also be effected by another means from the output Vo, and the voltage corresponding to the given applied voltage may also be subtracted directly from the output terminal g to obtain entirely the same operation and effect as those described above.

Figure 9:
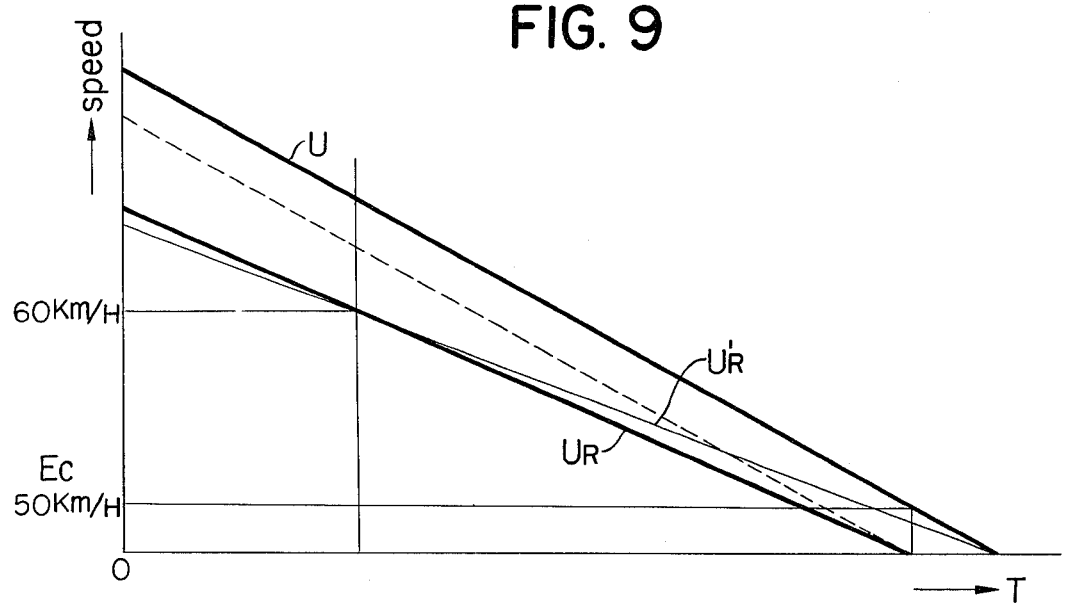
FIG. 9 is a graphic representation showing the relationship between the vehicle speed signal U of FIG. 9, the given applied voltage Ec in the circuit of FIG. 7, the reference wheel speed signal $U_R$, in the conventional circuit, and the reference wheel speed signal $U_R$ obtained by the circuit of FIG. 7.

In FIG. 9, there is shown one example of status in change with time of the vehicle speed signal U, the given applied voltage Ec in the circuit of FIG. 7, the reference wheel speed signal $U_R$ in the conventional circuit of FIG. 1, and the reference wheel speed signal $U_R$ in the circuit of FIG. 7.

As described above, the present invention particularly includes a signal level adjusting device for adjusting a level of at least one of a wheel speed signal and a reference wheel speed signal so as to uniformly increase a signal level of the wheel speed signal relative to the reference wheel speed signal. As a consequence, the invention may provide an antiskid brake device which, even if signal noise is contained in the wheel speed signal, does not give rise to erroneous operation of the antiskid device and does not adversely affect the operator's feel or sensitivity in operation of the brake device during braking, while minimizing the reduction of the braking efficiency within a satisfactorily small range.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, therefore, such adaptations should and are intended to be comprehended within the meaning and range of equivalence of the following claims.

What is claimed is:

1. An antiskid brake device for controlling the braking force of wheels during braking while performing a logical operation process of a wheel speed signal and a vehicle speed signal in the form of an input signal, the device at least comprising wheel speed signal generator means for generating a wheel speed signal in response to the peripheral speed of the wheel; vehicle speed signal generator means for generating a vehicle speed signal in response to the vehicle speed; reference wheel speed signal setting means for setting a reference wheel speed signal in response to said vehicle speed by adding a predetermined slip rate preset on the basis of said vehicle speed signal; signal level adjusting means for adjusting a level of at least one of said wheel speed signal and said reference wheel speed signal so as to uniformly increase a signal level of said wheel speed signal relative to said reference wheel speed signal; first comparator means for comparing said wheel speed signal with said reference wheel speed signal after at least one of these wheel speed signal and reference wheel speed signal has been adjusted in level by said signal level adjusting means; said wheel speed signal generator means having a digital output signal; digital to analog converter means connected to said wheel speed signal generator means for receiving said digital signal and converting said digital signal to a corresponding analog signal; differentiating means connected to the output of said digital to analog converter means and differentiating said analog signal to obtain a wheel acceleration signal, and second comparator means receiving said acceleration signal and comparing said acceleration signal with a reference deceleration signal; said second comparator means comprising a first comparator having an output signal only when the value of the wheel acceleration speed is smaller than the value of a reference wheel deceleration signal; second comparator having an output only when the value of the wheel acceleration signal is larger than the value of a first reference wheel acceleration signal; and third comparator having an output signal only when the value of the wheel acceleration signal is larger than the value of a second reference wheel acceleration signal; a fourth comparator having one input connected to said vehicle speed signal generator means for comparing the vehicle speed signal being signaled by said vehicle speed signal generator means with a predetermined relatively low reference vehicle speed signal and having an output only when the value of the vehicle speed signal is smaller than the value of the relatively low reference vehicle speed signal; first AND circuit means having one input connected to said first-mentioned comparator means and having a second input connected to the output of said first comparator; first OR circuit means having one input connected to the output of said second comparator and having a second input connected to the output of said fourth comparator; second OR circuit means having one input connected to the output of said first-mentioned comparator means and having a second input connected to the output of said first comparator, said second OR circuit means having a third input connected to the output of said second comparator; first inverter means connected to the output of said third comparator; and second inverter means connected to the output of said fourth comparator.

2. An antiskid brake device as defined in claim 1 wherein said signal level adjusting means comprises adding means for adding a wheel speed correspondence signal of a relatively small predetermined value to said wheel speed signal.

3. An antiskid brake device as defined in claim 1 wherein said signal level adjusting means comprises operational amplifier means for subtracting a signal value determined in response to a predetermined applied voltage from said vehicle speed signal in the stage prior to addition of said predetermined slip rate.

4. An antiskid brake device as defined in claim 1 wherein said signal level adjusting means comprises operational circuit means for subtracting a predetermined signal value from a signal obtained after adding said predetermined slip rate to said vehicle speed signal.

5. An antiskid brake device as defined in claim 1 including bistable circuit means with inputs connected to said first AND circuit means and said first OR circuit means; second AND circuit means connected to an output of said bistable circuit means, said first inverter means having an output connected to an input of said second AND circuit means; third AND circuit means having an input connected to the output of said second OR circuit means, said third AND circuit means having also an input connected to the output of said first inverter means; fourth AND circuit means having one input connected to the output of said third AND circuit means and having a second input connected to the output of said second inverter means.

6. An antiskid brake device as defined in claim 5 including first electromagnetic actuator means connected to the output of said second AND circuit means; and second electromagnetic actuator means connected to the output of said fourth AND circuit means, said first and second actuator means being operative so that action is not taken on the braking device by said actuator means when signals are not applied to said actuator means, so that the braking device increases freely its braking force applied to the associated wheel according to a brake operating input applied by an operator, said actuators being operative so that when a signal is applied to said second actuator means but not to said first actuator means each of said actuator means acts on the braking device whereby the braking force is held constant even if the brake operating input is increased, each of said actuator means acting on the braking device so that the braking force is decreased independent of the brake operating input when a signal is applied to both said first and second actuator means.

7. An antiskid brake device as defined in claim 6 wherein said relatively low reference vehicle speed signal corresponds to a threshold value of the vehicle speed which is so low that antiskid action is not required.

* * * * *